United States Patent Office 3,493,084
Patented Feb. 3, 1970

3,493,084
CLOSED-LOOP TYPE DISC-BRAKE
Jean Maurice, Paris, France, assignor to Société Anonyme Francaise du Ferodo, Paris, France, a corporation of France
Filed June 10, 1968, Ser. No. 735,878
Claims priority, application France, June 16, 1967, 110,687
Int. Cl. F16d 55/224
U.S. Cl. 188—73      16 Claims

ABSTRACT OF THE DISCLOSURE

A disc-brake of the kind comprising a rotating disc rigidly fixed to the member to be braked, two brake-shoes disposed on each side of said disc, a fixed support, and a hydraulic control unit carried by said fixed support and acting directly on one of said brake-shoes and indirectly on the other brake-shoe by means of a transfer member, said fixed support comprising housings for said brake-shoes and fixing means for the removable mounting of said control unit.

By this arrangement, the distribution of the functions of the various constituent parts of the brake is such that each of said constituents is subjected only to simple, well-defined forces and in consequence the brake parts can be produced by an appropriate assembly of suitably cut-out and shaped pieces of sheet steel. The mounting of the control unit itself ensures the locking of all the constituent parts of the brake.

---

The present invention has for its object a disc brake of the kind comprising a rotating disc rigidly fixed to the member to be braked, two brakes-shoes arranged on each side of the said disc, a fixed support, and a hydraulic control unit carried by the said fixed support and acting directly on one of the shoes and indirectly on the other through the intermediary of a transfer member, and characterized in that the said fixed support comprises on the one hand housing for the shoes and on the other hand fixing means for the removable mounting of the control unit.

By virtue of this arrangement, the distribution of the functions carried out inside the brake by the various constituent parts of this latter is clear, so that each of the said constituent parts is only subjected to simple clearly-defined forces: the fixed support absorbs the braking torque, the transfer member transmits to one of the shoes the axial braking force developed by the control unit, and during braking, the control unit is only subjected to the pressure forces of the fluid admitted to it.

Thus, as each of these elements is only subjected to simple forces, they can be advantageously and economically produced by an appropriate mounting of steel-sheet parts, suitably cut-out and assembled.

In addition, according to an important characteristic feature of the invention, it is the control unit which is the last piece to be put in position during the mounting of the brake, parallel to the plane of the disc, and this control unit itself provides the general locking of the various constitutent elements of the brake, preferably including the radial locking of at least one of the shoes. In order to provide access to the brake-shoes for changing them, the control unit which is readily removed is withdrawn, without of course it being necessary for this purpose to disconnect the hydraulic control conduits of the said unit.

According to a preferred form of embodiment of the invention, the guiding of the transfer member perpendicular to the disc, the said member being preferably a ring having its mean plane perpendicular to the mean plane of the disc, is effected on at least four parallel flat bearing surfaces perpendicular to the plane of the disc, of which two for example are formed on the fixed support and two on the control unit.

The fixed support and/or the control unit preferably further comprise abutment means limiting the movement of the ring perpendicular to its plane.

According to a particular form of construction, the fixed support and the control unit co-operate with each other so as to ensure this limitation of movement, on each side of the transfer member.

Furthermore, in accordance with another characteristic feature of the invention, at least one of the walls of the housing of at least one of the shoes is formed by the control unit or by a plate fixed to this unit and/or by a plate fixed to the transfer member.

In an alternative form of construction, the housing of at least one of the shoes has all its walls formed in the fixed support.

According to another alternative form, each shoe housing has at least one of its walls formed by the control unit, and for this purpose, the latter preferably comprises an extension which overhangs the disc.

By this means, the changing of the shoes after wear is greatly facilitated; in fact it is only necessary to remove the control unit in order to have free access to the whole of the two shoes.

In addition, elastic means such as a curved flexible blade are preferably interposed between the shoes and/or the transfer member on the one hand, and the fixed support and/or the control unit on the other.

According to a preferred form of construction, the fixed support is provided on each side of the shoe housings or of the control unit, with two springs interposed between the said fixed support and the transfer member, each spring being coupled to the support at at least one point or zone, known as the fixing point, and being supported on the said transfer member at a point known as the supporting point, the said fixing and supporting points being displaced one with respect to the other with reference to the plane of symmetry of the brake which passes through the axis of the disc.

These springs are preferably arranged as far as possible from the control unit about which the transfer member could have a tendency to rock; they have the purpose of applying this transfer member against the fixed support, to obtain a better guiding of this latter, with a pressure sufficiently strong to oppose any possible undesired movements of the transfer member due to the vibrations and shocks to which the brake may be subjected, and in this respect, they assist advantageously in a silent operation of this latter while being sufficiently weak to permit movements of the transfer member during braking.

Each of these springs is preferably deformable elastically about its fixing point or zone.

This arrangement has a two-fold advantage: on the one hand, each spring can thus follow, by simple deformation without relative movement, the displacements of the transfer member, any such relative movement being necessarily liable to cause undesirable wear and noise; and on the other hand, after such deformation, each spring assists the elastic return of the transfer member to its initial position which ensures, after braking, a better detachment of the shoes from the disc and for this reason reduces the wear on the shoes.

After such a deformation travel, there may of course take place a skidding of these springs on the transfer member if the wear of the shoes acting during the course of braking considered is too great; in this connection, as these springs ensure by their own deformation a predetermined clamping travel, before slipping, they play the part of automatic means for taking-up play due to the wear of the shoes. This slipping may furthermore be controlled by providing striations on the transfer member at the zone of support of these springs.

According to another improvement in conformity with the invention, the hydraulic control unit comprises two pistons which slide in opposite directions in a cylinder, and one of which acts on the transfer member, a domed plate is interposed between the said piston and the said transfer member, this domed plate being supported at its periphery on the said piston and at its central zone on the said transfer member.

This arrangement advantageously introduces a universal coupling between the said piston and the transfer member, which prevents the latter and/or the said piston from having any tendency to jam in the case where the axis of the possible displacements of the transfer member does not coincide exactly with the axis of thrust of the said piston.

These and other improvements, their characteristic features and their advantages will be further brought out in the description which follows below, given by way of example only with reference to the accompanying drawings, in which:

Figure 2:
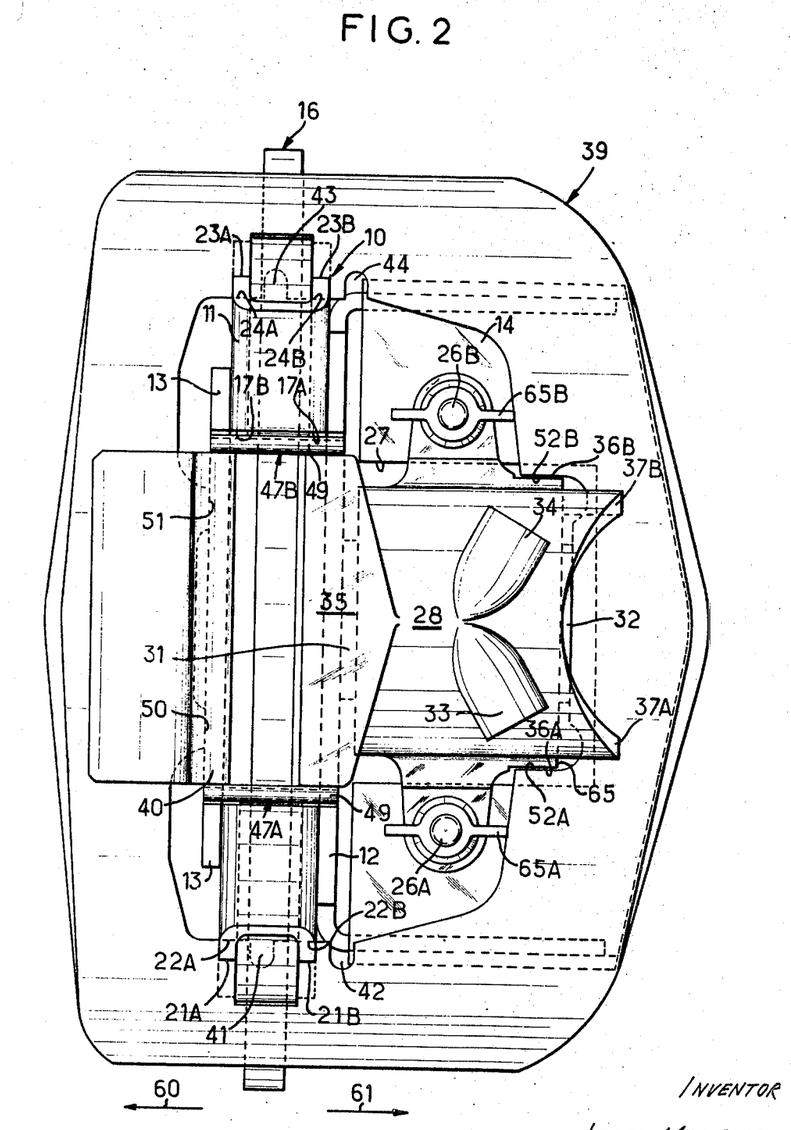
FIG. 2 is a view of this brake looking in the direction of the arrow II of FIG 1.
Figure 3:
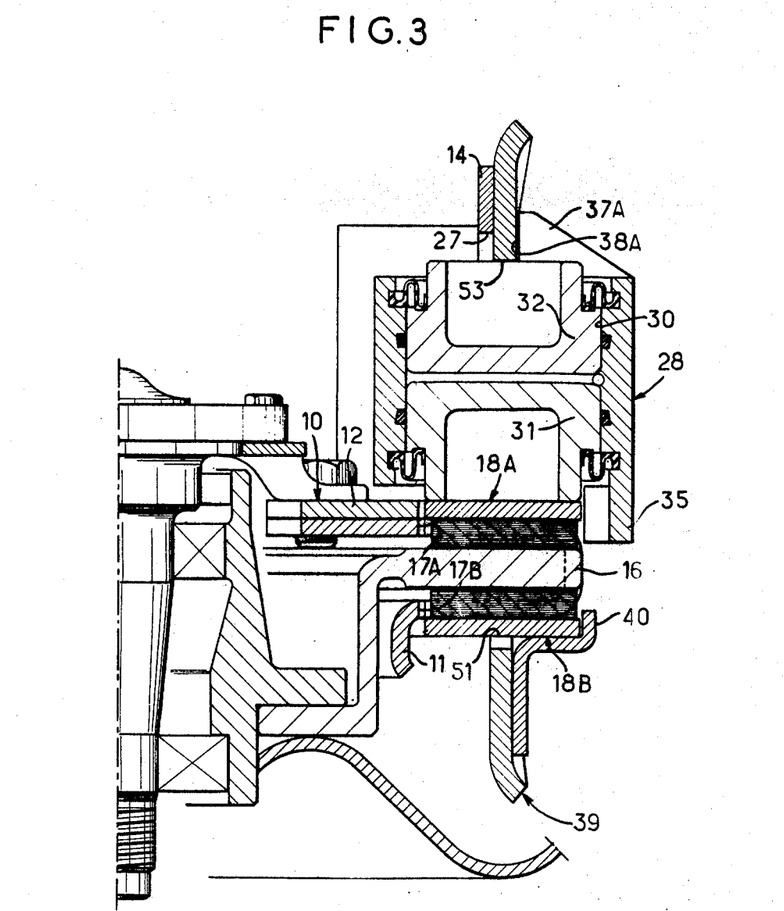
FIG. 3 is a view in cross-section taken along the line III—III of FIG. 1.
Figure 4:
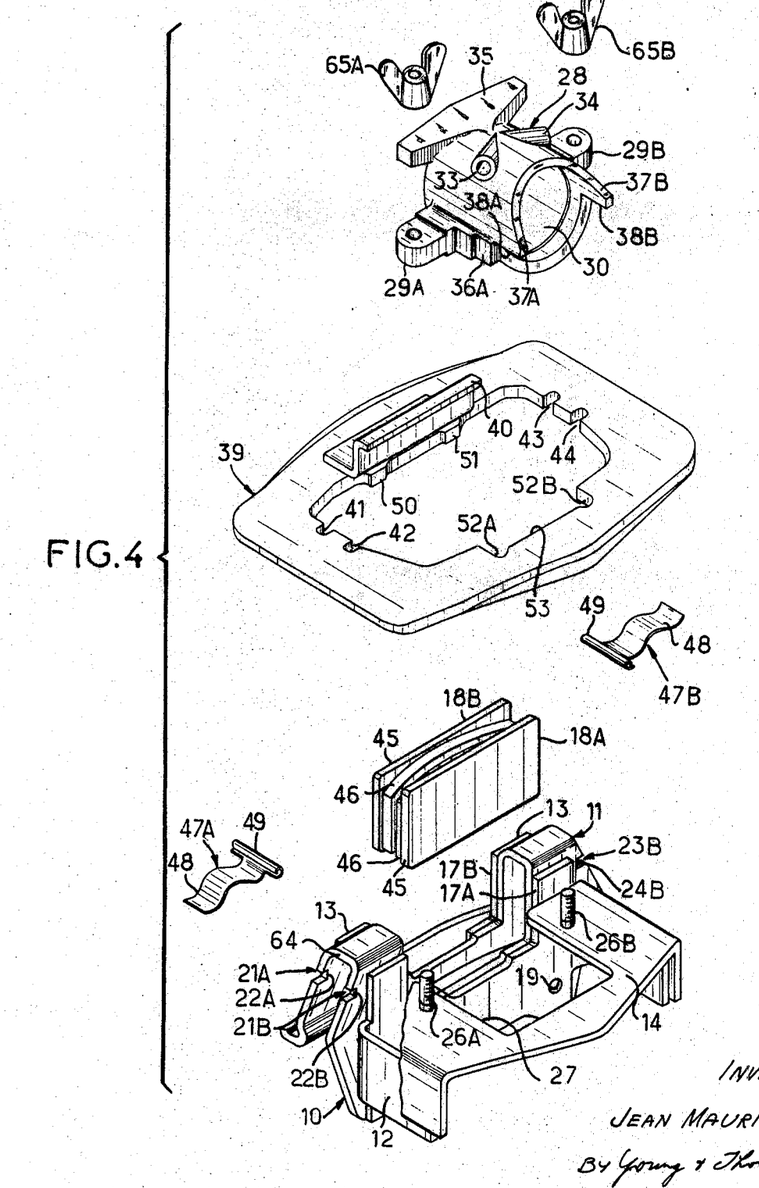
FIG. 4 is a view in exploded perspective of this brake, to a smaller scale.

In accordance with the form of embodiment selected and shown in FIGS. 1 to 8, and more particularly seen in FIG. 4, the disc brake according to the invention comprises a fixed support 10 formed on the one hand by a U-shaped part 11 provided on one of its faces with a bracket 12 and on its other face with two reinforcing members 13, and on the other hand by an end-plate 14 carried by the bracket 12 perpendicular to the faces of the part 11. These various parts are of sheet metal, suitably cut-out and bent, and are fixed to each other by welding, brazing or any other appropriate means of rigid assembly.

The part 11 of the support 10 is intended to be engaged about a disc 16 rigidly fixed to the wheel to be braked, and each of its faces is provided with a notch 17A, 17B respectively intended to serve as a housing for a brakeshoe 18A, 18B respectively. Thus, in the form of construction shown, the said housings 17A, 17B are open along the whole length of that of their sides which, perpendicular to a radial direction of the disc 16, is the nearest to the periphery of this disc.

The part 11 and the associated bracket 12 are provided at their lower parts with two drilled holes 19, 20 permitting the fixing of the support 10 on the vehicle, for example on the stub axle of the wheel to be braked (see FIG. 3).

On one of its sides, the faces of the part 11 are provided with slots 21A, 21B respectively in correspondence with each other. The bottoms 22A, 22B of these notches form flat co-planar bearing surfaces perpendicular to the disc 16.

Similarly, on its other side, the faces of the path 11 are provided with notches 23A, 23B the bottoms 24A, 24B of which form flat co-planar bearing surfaces perpendicular to the disc 16.

The end-plate 14 carries two threaded shafts 26A, 26B on each side of a cut-out central portion 27, permitting the placing in position of a control unit 28 opposite the notches 17A, 17B of the U-shaped piece 11; the threaded shafts 26A, 26B are perpendicular to the end-plate 14 and therefore parallel to the disc 16.

The control unit 28 is provided with two lateral lugs 29A, 29B intended to be engaged on the threaded shafts 26A, 26B respectively, and is hollowed out by a bore 30 in which two pistons 31, 32, known respectively as the primary piston and the secondary piston, are mounted so as to slide in opposite directions under the control of a hydraulic braking circuit, of which there are shown at 33 and 34 respectively the fluid intake coupling and a drainage nozzle.

The control unit 28 is provided externally with an extension 35 in the form of a plate vertically above the primary piston 31 and, on each side of the secondary piston 32, with two flat bearing surfaces 36A, 36B respectively, perpendicular to the plane of the disc 16 and to the plane 35; in addition, the control unit is provided, on each side of the secondary piston 32, with two forwardly-projecting arms 37A, 37B, of which the lower faces 38A, 38B form two flat co-planar bearing surfaces perpendicular to the plane of the disc 16 and parallel to the end-plate 14.

With the control unit 28 is associated a transfer member 39 which, in the form of the embodiment shown, is a practically flat ring with a substantially rectangular contour. Along one of the large sides of its internal contour, the ring 39 is provided with a plate 40 and has co-planar bearing surfaces 50 and 51. Along its other large side, the ring 39 is provided with two parallel bearing surfaces 52A, 52B, perpendicular to those preceding, on each side of a surface 53 substantially parallel to the surfaces 50 and 51. On its small sides, the internal contour of the ring is provided with notches 41, 42, 43, 44 opposite each other in pairs.

With regard to the brake-shoes 18A, 18B, these are each formed in known manner by a plate 45 and a friction lining 46 fixed on the said plate.

The brake acording to the invention further comprises two springs 47A, 47B, each formed by a corrugated blade 48 provided at one of its extremities with a transverse supporting bead 49 which extends considerably on each side of the blade 48.

The assembly of this brake is carried out in the following manner:

After engaging the support 10 on the disc 16 and fixing the said support on the stub-axle of the wheel to be braked, the ring 39 is placed in position by presenting the notches 41 to 44 of the internal contour of this ring opposite the lateral faces of the U-shaped supporting member 11. When the ring comes level with the lateral notches 21A, 21B, 23A, 23B of the member 11, the ring 39 is slid into these notches in the direction of the arrow 60 of FIG. 2. The brake-shoe 18B is then placed in position in the notch 17B of the support 10. The ring 39 then slides in the direction of the arrow 61 of FIG. 2 until it comes into contact with the shoe 18B. In this movement, the plate 40 carried by the ring 39 comes on top of the brake-shoe B and thus locks this latter radially in a housing formed conjointly by the notch 17A of the fixed support 10 and the plate 40.

The second brake-shoe 18A is then put in position in the notch 17A of the support 10, after which the control unit 28 is engaged in the cutout portion 27 of the end-plate 14 and is fixed on the threaded shafts 26A, 26B carried by this latter, by means of clamping nuts 65A, 65B. During the course of this mounting in position, the plate 35 of the control unit comes on top of the brake-shoe 18A and thus locks this latter radially in a housing formed conjointly by the notch 17A of the fixed support 10 and the plate 35.

It will be noted that the movement of the ring 39 perpendicular to its plane is prevented on one side by the arms 37A and 37B of the control unit, and on the other side by the end-plate 14, in addition to the notches 21A, 21B, 23A 23B of the U-shaped member 11.

The assembly is completed by placing in position the damping springs 47A, 47B between the ring 39 and the fixed support 10 with the support of the beads 49 of these springs on the shoes 18A, 18B, respectively. Each spring 47A, 47B is supported by a corrugation 62 for example (see FIG. 1) against the ring 39, and by another corrugation 63 against the inner face of the bottom 64 of the U-shaped member 11.

Figure 1:
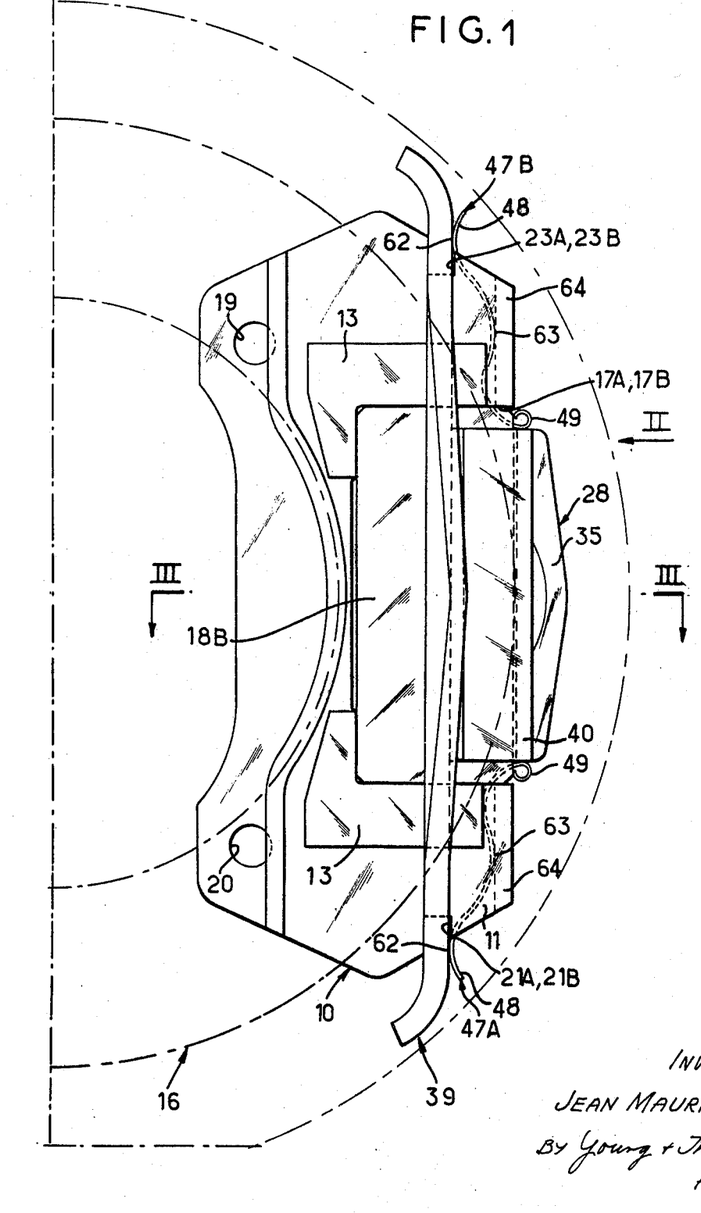
FIG. 1 is a view in elevation of a brake according to the invention.

It will be observed from FIGS. 1 and 2 that the springs 47A, 47B are held in position by their beads 49 inserted between the member 11 and the plates 35 and 40.

As will be easily understood, the sliding of the ring 39 in the direction of either of the arrows 60 and 61 of FIG. 2 is limited on one side by the abutment of its bearing surfaces 50, 51 against the secondary shoe 18B, and on the other side by abutment of its bearing surface 53 against the outer extremity of the piston 32. It will be noted that as and when the brake-shoes wear, the ring 39 moves with respect to the member 11 only in the direction of the arrow 61 of FIG. 2.

In this movement, the notches 41 to 44 of the ring 39 will never come opposite the lateral faces of the U-shaped member.

The edge of the ring 39 co-operates by itself in guiding with the bottom of the notches 21A, 21B, 23A, 23B of the support 10, perpendicular to the plane of the disc 16. These notches further constitute an abutment means to limit the movement of the ring perpendicular to its plane. This limitation is completed by the bearing surfaces 38A, 38B formed in the lower faces of the projecting arms 37A, 37B of the control unit 28.

As will be explained below, the two bearing surfaces 36A, 36B formed in the control unit 28, also contribute to the guiding of the ring perpendicular to the plane of the disc 16.

The operation of a brake of this kind is well known per se: When a braking pressure is sent into the circuit to which the control unit 28 is coupled, this pressure is applied directly to the shoe 18A by the primary piston 31, and the force developed by the secondary piston 32 on the ring 30 is transmitted by this latter to the brake-shoe 18B. The disc 16 is thus locally gripped between the brake-shoes 18A, 18B, and is therefore braked until the disc is eventually stopped.

The springs 47A and 47B advantageously absorb any possible vibrations.

It is important to emphasize the definite distribution of the forces to which the various parts of the brake are subjected, this distribution being definite and resulting in the fact that each of the said parts is only subjected to a simple and well-defined force.

Changing of the shoes is effected by removing the control unit 28. This removal does not, of course, imply the necessity of disconnecting the hydraulic circuit. It is then only necessary to slide the ring 39 in the direction of the arrow 60 of FIG. 2 and then to remove the springs 47A, 47B so as to have access to the brake-shoe 18B, and then finally to slide the ring 39 in the direction of the arrow 61 of FIG. 2 so as to have access to the brake-shoe 18A. The removal of the control unit 28 further advantageously enables the pistons which are slidably mounted therein to be pushed back into the interior of the unit without difficulty, even by hand, this displacement of the pistons being necessary for the installation of new brake-shoes.

Figure 5:
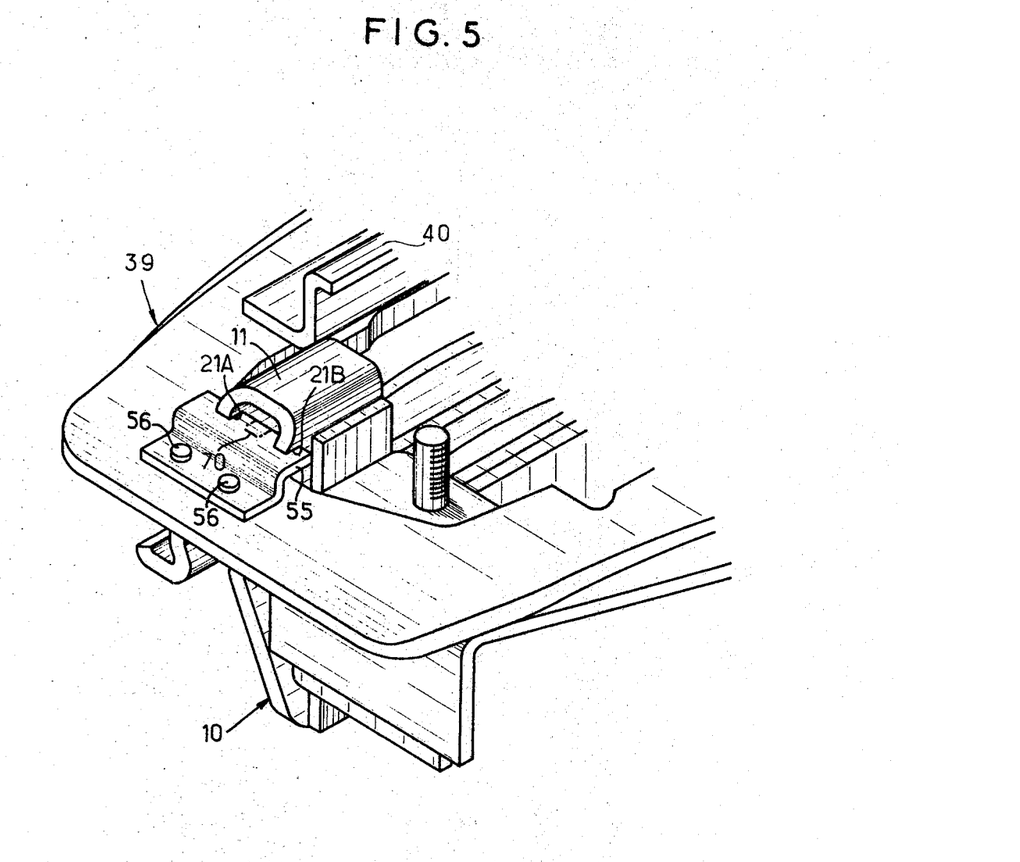
FIG. 5 is a view in partial perspective relating to an alternative form of construction.

FIG. 5 relates to an alternative form in which the guiding of the ring 39 in the notches 21A, 21B, for example, of the fixed support 10 is effected not by the actual edge of the ring but by a part 55 fixed on the edge, for example, by rivets 56, after the ring 39 has been placed in position. This arrangement avoids the necessity of providing notches 41 to 44 on the internal contour of the ring, which might weaken this later.

It will be noted that it is then impossible for the user to remove the ring 39 but it has already been seen that this removal is not necessary for changing brake-shoes.

If, however, it is desired to have the possibility of removing the ring 39, it is only necessary to provide one single notch 70 in the part 55, towards the central zone of this latter. This notch 70 has been shown diagrammatically in broken lines in FIG. 5.

The removal of the ring 39 is then effected in the following manner: the notch 70 is brought opposite the notch 21A and the part 55 then escapes from the U-shaped member 11 of the support 10.

The part 55 is preferably but not necessarily an elastic member, which can thus advantageously be substituted for the springs 47A, 47B described in the previous embodiment, in order to apply the ring 39 against the member 11.

As will have been observed, the bracket 12 of the support 10 on the one hand and the reinforcing pieces 13 of the U-shaped member of the support on the other, contribute in giving the notches 17A, 17B serving as housings for the brake-shoes, a greater transverse dimension perpendicular to the plane of the disc 16, which ensures better guiding of the said shoes during the course of wear.

Figure 6:
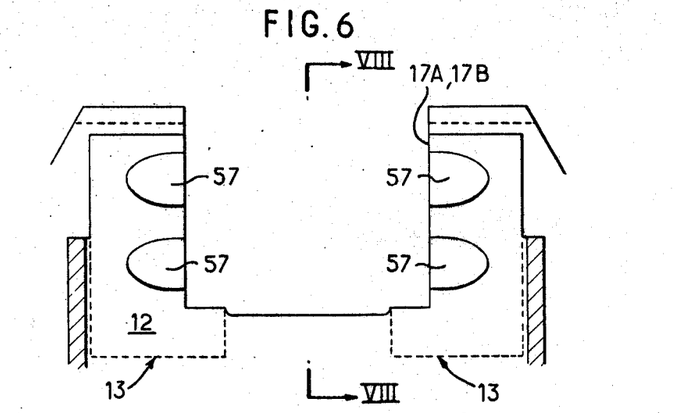
FIGS. 6, 7 and 8 are partial views, in elevation, in plan, and in axial section respectively, relating to an alternative form of construction of one of the constituent elements of a brake according to the invention.
Figure 7:
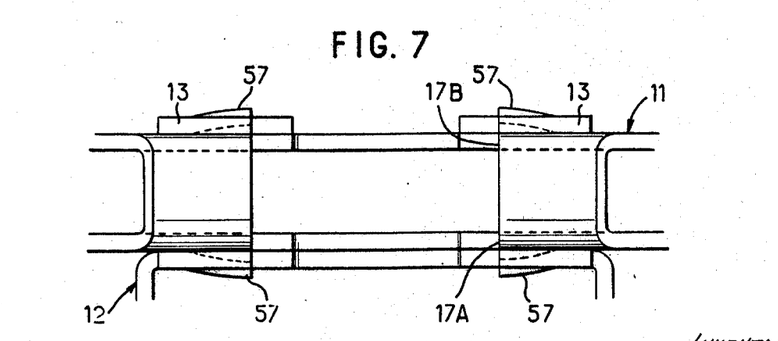
Figure 8:
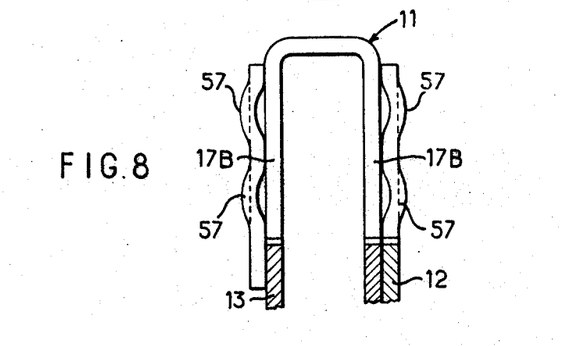

FIGS. 6 to 8 relate to an alternative form in which this transverse dimension has been made still larger by forming, for example, by punching, in the reinforcing members 13 and in the bracket 12, at the periphery of the notches 17A, 17B, projections, bosses or deformations 57 which, according to the form of construction shown, are in the form of a quarter olive.

According to other alternative forms (not shown), the notches 21A, 21B, 23A, 23B of the U-shaped member 11 are formed in part by the member 11 itself and in part by one or more pieces fixed on this member.

There will now be described with reference to FIGS. 9 to 11, a further alternative form of construction of the brake according to the invention.

In these figures, there is again seen at 10 the fixed support of the brake, formed by a U-shaped member 11 provided on one of its faces with a bracket 12, and on the other of its faces with two reinforcing members 13; the bracket 12 has angles 14A, 14B directed towards each other, perpendicular to the faces of the member 11.

The member 11 of the support 10 is intended to be engaged on a disc 16 rigidly fixed to the wheel to be braked, and each of its faces is provided with a notch, 17A, 17B respectively, intended to serve as a housing for a brake-shoe 18A, 18B respectively.

On one of the sides of the member 11, the two faces of this member are provided on their edges with stepped portions 121A, 121B respectively in correspondence with each other; these stepped portions form flat co-planar bearing surfaces perpendicular to the disc 16.

Similarly, on its other side, the faces of the member 11 are provided on their edges with stepped portions 123A, 123B forming flat co-planar surfaces perpendicular to the disc 16.

The control unit 28, which is provided laterally with two lugs 29A, 29B is fixed by bolts 126A, 126B respectively on the angles 14A, 14B of the bracket 12; as previously, it is hollowed out with a bore 30 in which two pistons 31, 32 are slidably mounted in opposite directions, under the control of a hydraulic braking circuit (not shown).

Externally, the control unit 28 comprises an overhung plate 135 which, in accordance with the present alternative, overhangs successively the notch 17A of the member 11, the disc 16 and the notch 17B of the member 11. This plate 135 ensures simultaneously the radial maintenance of the shoes 18A, 18B through the intermediary of a spring 200.

This spring 200 comprises two elastic blades 201A, 201B, each associated respectively with the shoes 18A, 18B and arranged on each side of a common central body 203. This latter comprises two arms 204, 205 extending transversely with respect to the plate 135 of the unit 28, passing round the plate and capable of being bent back on this plate in order to fix the spring 200 to the plate, as shown diagrammatically in broken lines in FIG. 9.

With the control unit 28 is associated a transfer ring 39, of which the internal contour (see FIG. 10) is provided on the one hand with two guiding surfaces 52A, 52B in contact with the control unit 28, and on the other hand two guiding surfaces 207A, 207B in contact with the stepped portions 121B, 123B only of the member 11. On the other hand, this contour is largely spaced away from the stepped portions 121A, 123A of the member 11. Thus, only the four bearing surfaces 121B, 123B, 52A, 52B ensure the guiding of the ring 39, these surfaces being all parallel to each other and perpendicular to the disc 16.

Figure 11:
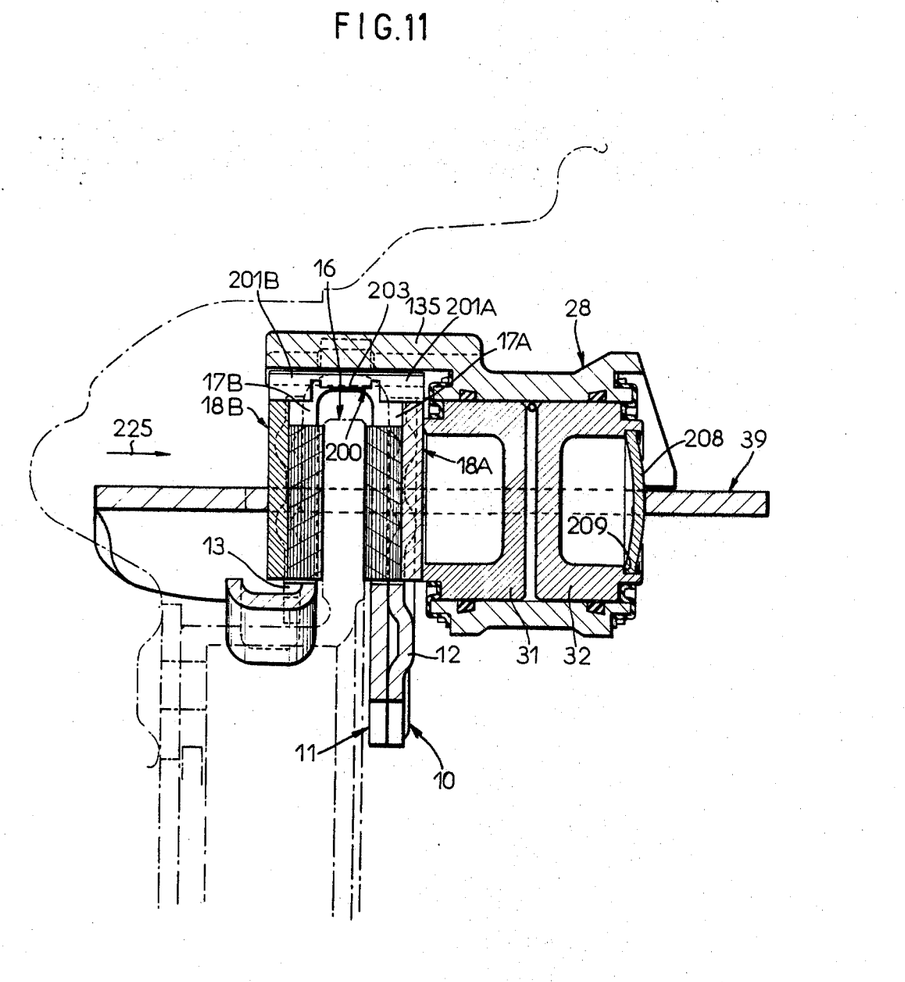
FIG. 11 is a view in cross-section taken along the line XI—XI of FIG. 10.

According to the present alternative construction, between the piston 32 and the ring 39 is inserted a domed plate 208 which is supported at its periphery on a stepped portion 209 of this piston and by its central portion on the ring 39 (see FIG. 11).

As in the previous case, the fixed support 10 comprises a U-shaped member 11 and the base 210 of this member vertically above the disc 16, is split-out into two sections 211A, 211B on each side of the shoe housing 17A, 17B.

In accordance with the present alternative construction, with each of these sections 211A, 211B, there is associated a spring 212A, 212B respectively, of which only one will be described below.

This spring is a U-shaped pin, the central curved portion 214 of which is bent back and is in contact with the transfer ring 39 at a point 215, known as the supporting point. The arms 216 of this pin are bent along an axis perpendicular to the disc 16. They are thus applied against the inner face of the section 211A, 211B considered of the U-shaped member 11, and are furthermore bent back in the form of hooks 217 on the outer face of the said section.

The spring 212A, 212B considered is thus supported between the transfer ring 39 and the U-shaped member 11, and is fixed to this latter at a well-defined fixing zone. For convenience of explanation, this zone has been shown diagrammatically by a shaded circle 218 in FIG. 10; as can be seen, the supporting point 215 of the spring considered on the ring 39 and the fixing zone 218 of this spring are displaced with respect to each other relative to the plane of symmetry of the brake passing through the axis of the disc 16.

Figure 9:
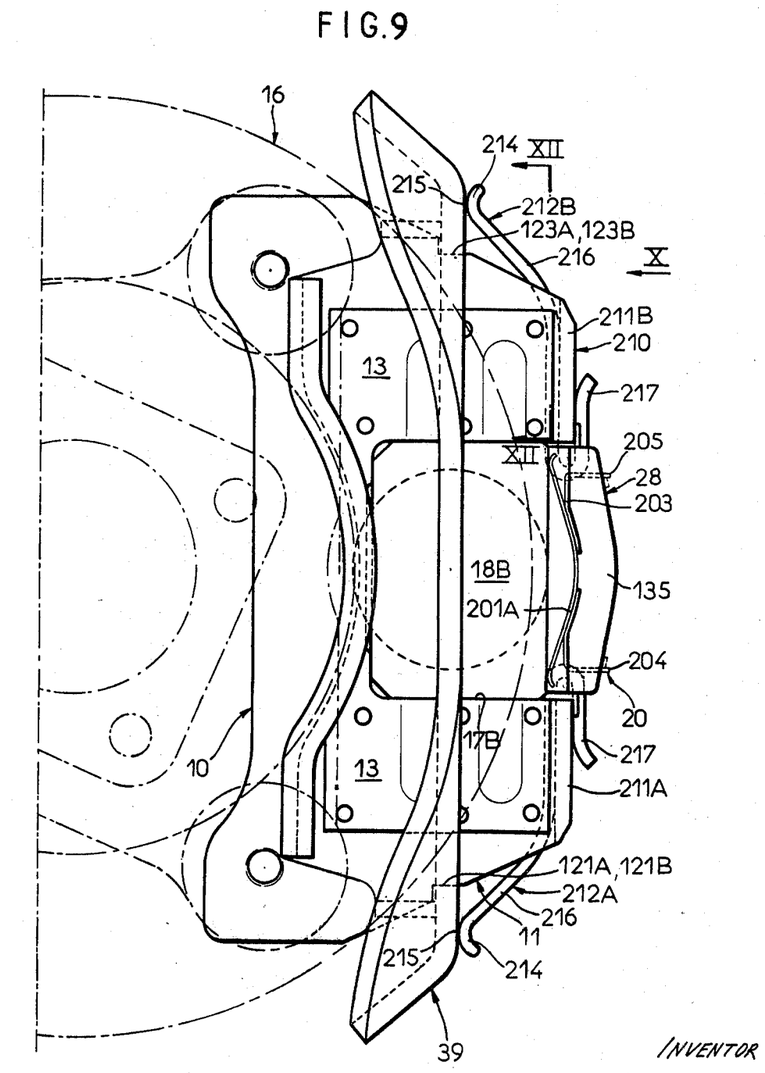
FIG. 9 is a view in elevation of an alternative form of embodiment.
Figure 10:
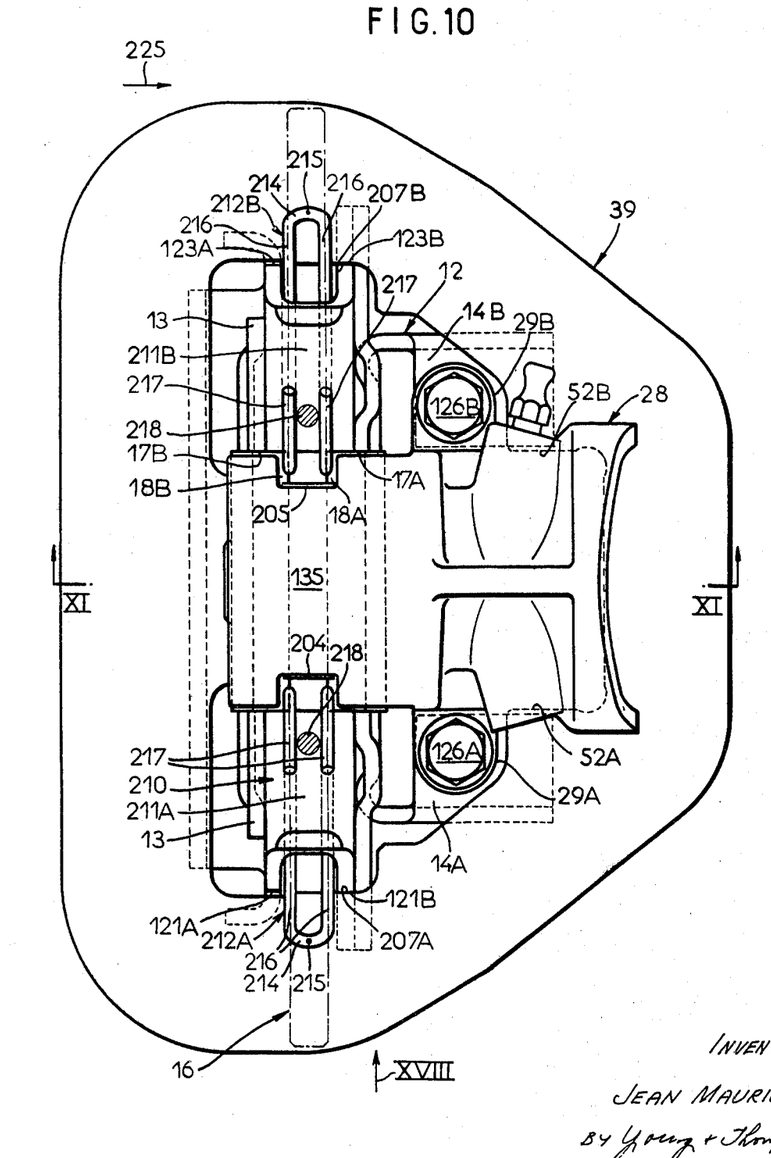
FIG. 10 is a view of this alternative, looking in the direction of the arrow X of FIG. 9.

As shown in FIGS. 9 to 11, the arms 216 of a spring 212A, 212B are straight and are not in contact with the U-shaped member 11. Thus, a spring of this kind can pivot about its fixing zone 218.

Figure 12:
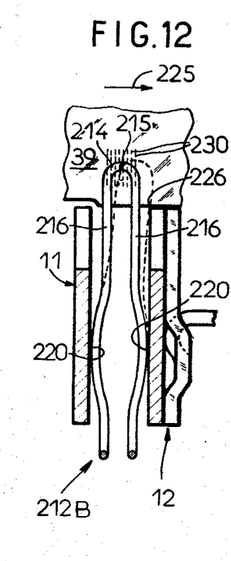
FIG. 12 is a view in partial cross-section of this alternative, taken along the line XII—XII of FIG. 9.

Preferably however and as shown in FIG. 12, the arms 216 are bent along an axis parallel to the disc 16 so that they are each in contact with the member 11 at a point 220 which, for each arm 216 plays the part of a "fixing point" about which it can pivot.

The operation of the brake shown in FIGS. 9 to 11 is similar to that previously described: When a braking pressure is sent into the circuit to which the control unit 28 is connected, this pressure is directly applied to the shoe 18A by the piston 31, while the force developed by the piston 32 on the transfer ring 39, through the intermediary of the plate 208, causes the displacement of the ring 39 in the direction of the arrow 225 in FIGS. 10, 11 and 12, and in consequence, the transmission of this force to the brake-shoe 18B. The disc 16 is thus locally gripped between the brake-shoes 18A and 18B, and is thus braked, until it stops, if so required.

When the braking pressure is released, the brake-shoes and the transfer ring return to their initial position: the disc 16 is released.

According to one of the aspects of the invention, the return of the transfer ring 39 is ensured, at least in part, by the springs 212A, 212B.

This particular method of action of the springs will be better understood by reference to FIG. 12, which concerns only the spring 212B, the process being similar for the spring 212A.

During braking, the transfer ring 39 drives the springs 212A, 212B without slip. This drive causes an elastic deformation of these springs, as shown diagrammatically in broken lines in FIG. 12, for the spring 212B, until they abut against the U-shaped member 11, against the edge 226 of this later. This travel of elastic deformation preferably corresponds to the normal gripping travel of the disc 16.

When the braking force is released, the springs 212A, 212B return elastically to their initial shape, which assists in ensuring the return movement of the transfer ring 39 in a direction opposite to that of the arrow 225.

During the course of this deformation, each arm 216 of these springs pivots about its "fixing point" 220; in the case where such a point does not exist (FIGS. 9 to 11) the arms 216 pivot conjointly about their common "fixing zone" 218.

The springs 212A, 212B have of course also the function of maintaining the transfer ring 39 suitably applied against the bracket 12 of the support 10.

If, during the course of braking, the shoes 18A, 18B become worn, the springs 212A, 212B, in abutment at 220 against the member 11 slip at the contact of the ring 39, which continues to move in the direction of the arrow 225 as and when this wear takes place. When the brake is released, they ensure the return movement of the transfer ring 39 by an amount which is independent of this wear; they thus play the part of automatic taking-up means for the play due to wear. If necessary, the ring 39 may be provided with striations 230 at the level of the support of the springs 212A, 212B, as shown in FIG. 12.

Figure 13:
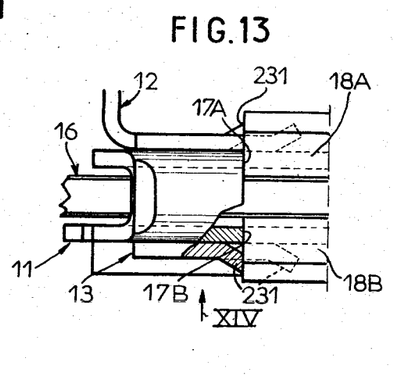
FIG. 13 is a view which represents in part a detail of FIG. 10, the transfer member being omitted, and relates to an alternative form of construction.
Figure 14:
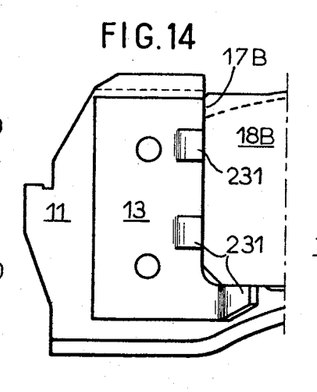
FIG. 14 is a view of this alternative, taken in the direction of the arrow XIV of FIG. 13.

According to the alternative form of construction shown in FIGS. 13 and 14, the bracket 12 and the reinforcing parts 13 are provided, at the periphery of the shoe housings 17A, 17B, with tongues 231 formed by cutting-out; by bending, these tongues project towards the exterior by an amount at most equal to the corresponding thickness of the steel sheet, and have the purpose of giving better guiding of the shoes 18A, 18B; they play the part of the deformations 57 described with reference to FIGS. 6 and 7.

Figure 15:
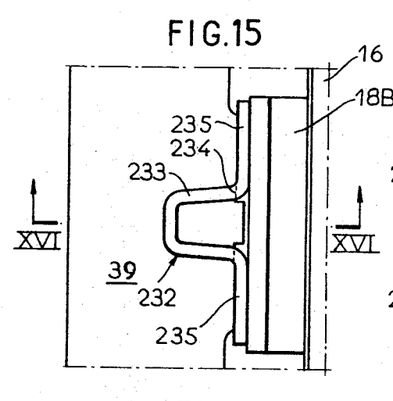
FIG. 15 is a view which in part represents a further detail of FIG. 10, the control unit being omitted, and relates to another alternative form of construction.
Figure 16:
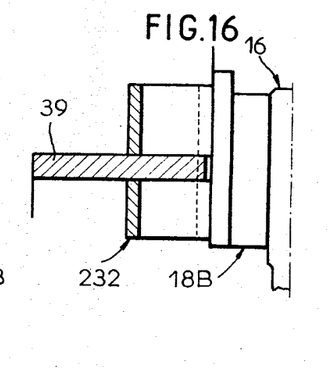
FIG. 16 is a view of this alternative in cross-section, taken along the line XVI—XVI of FIG. 15.
Figure 17:
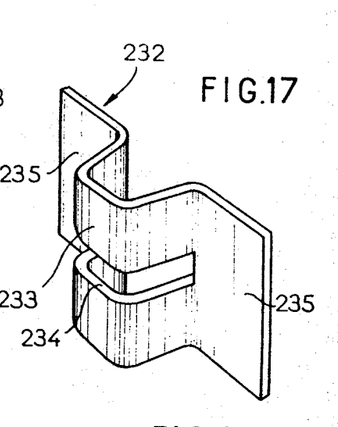
FIG. 17 is a perspective view of one of the parts employed in this alternative form.

According to the alternative form of construction shown in FIGS. 15 and 16, a buffer 232 is interposed between the transfer ring 39 and the brake-shoe 18B for a better application of the braking force to this latter. This buffer 232, shown separately in FIG. 17, is an omega-shaped piece, of which the curved central portion 233 is given a notch 234 for engagement on the ring 39, and the flanges 235 of which have one of their faces in contact with the ring 39 and the other in contact with the shoe 18B.

Figure 18:
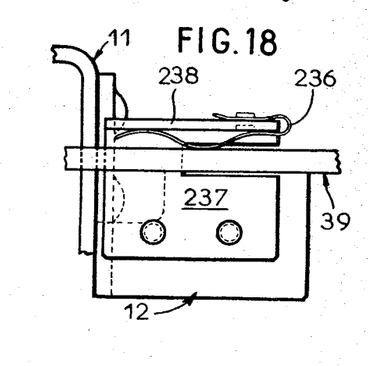
FIG. 18 is a partial view of a brake according to the invention, taken in the direction of the arrow XVIII of FIG. 10, and concerns another alternative form of construction.

Following the form of construction shown in FIG. 18, the springs 212A, 212B described above are replaced by springs 236, of which only one can be seen in FIG. 18; each of these springs is interposed between the ring 39 and a part 237 fixed to the bracket 12 at its lower portion. This part passes round the ring 39 and has at its upper portion a return 238 parallel to this latter. It is to this return that the spring 236 considered is fixed.

The springs 236 have the sole function of ensuring correct application of the transfer ring 39 against the bracket 12.

It will of course be understood that the present invention is not limited to the forms of construction described and shown, but includes all alternative forms of construction or combinataion of their various elements.

What I claim is:

1. A disc brake comprising a fixed support in the form of a U-shaped member to be disposed about a brake disc, said fixed support having a bearing projection extending parallel to the axis of the brake, two brake shoe housings adapted to be disposed on opposite sides of the brake disc and each housing having several walls formed at least in part by said U-shaped member, a brake shoe disposed in each said housing, a double-ended control cylinder, means for removably securing said control cylinder on said bearing projection, said control cylinder having at least one guiding projection which is spaced from said bearing projection and forms with said bearing projection guide means parallel to the axis of the brake, a ring-shaped transfer member surrounding said control cylinder and said brake shoes and a portion of said U-shaped member, said transfer member resting on said bearing projection parallel to the axis of the brake and being movable in said guiding means parallel to the axis of the brake, a first piston movable in one end of said control cylinder and adapted to bear on a first of said brake shoes to urge said first brake shoe into engagement with a said brake disc, a second piston movable in the other end of said control cylinder and adapted to bear on said transfer member to move said transfer member in a direction opposite to the direction in which the first brake shoe is moved to bring the second brake shoe into engagement with a said brake disc and lateral guiding means for guiding said transfer member parallel to the axis of the brake.

2. A disc as claimed in claim 1, said removably securing means comprising two pins perpendicular to the axis of the brake, said control cylinder having two lugs engageable with said pins.

3. A disc brake as claimed in claim 1, said transfer member having a plate which forms at least one of said walls of at least one of said brake shoe housings.

4. A disc brake as claimed in claim 1, said transfer member having retaining means to retain at least one of said brake shoes in a direction perpendicular to the axis of the brake.

5. A disc brake as claimed in claim 1, all the said walls of at least one of said brake shoe housings being formed in the said U-shaped member.

6. A disc brake as claimed in claim 1, said lateral guiding means comprising two flat parallel bearing surfaces formed on the control cylinder parallel to said axis and two flat parallel bearing surfaces formed on said fixed support parallel to said axis, all said bearing surfaces being disposed on the same side of a said brake disc.

7. A disc brake as claimed in claim 1, said fixed support having abutment means to retain said transfer member perpendicular to the axis of the brake, said abutment means being disposed on the brake disc side of the control cylinder.

8. A disc brake as claimed in claim 1, and engagement means disposed between said transfer member and one of said brake shoes, said engagement means comprising a hat-shaped buffer having a curved median portion and two lateral flanges, said curved portion having a notch by which said buffer is engaged on said transfer member, said two lateral flanges engaging said one brake shoe.

9. A disc brake as claimed in claim 1, at least one of said walls of said brake shoe housings having bent cut-out tongues extending parallel to the axis of the brake.

10. A disc brake as claimed in claim 1, and two springs disposed between said fixed support and said transfer member on each side of the plane of symmetry of the brake that passes through the axis of the brake, each spring being coupled to said support at at least one point and being supported on said transfer member at another point, said one and another points being displaced relative to each other with reference to said plane of symmetry.

11. A disc brake as claimed in claim 10, each said spring being in the form of a U-shaped pin having a curved central portion and two lateral arms, said pin being supported against said transfer member by said curved central portion and having said two arms bent back to form a hook, said pin being engaged on said U-shaped member by said hook, said arms being further transversely curved for engagement with said U-shaped member.

12. A disc brake as claimed in claim 1, and elastic means disposed between a said brake shoe and at least one wall of the corresponding brake shoe housing.

13. A disc brake as claimed in claim 12, said elastic means being disposed between said fixed support and said transfer member, said elastic means comprising two curved blades on each side of the plane of symmetry of the brake which passes through the axis of the brake, each said blade having one end resting on said transfer member and a curved median portion in engagement with said fixed support and another end having two lateral extensions each resting on said brake shoe.

14. A disc brake as claimed in claim 1, said control cylinder having an extension parallel to the axis of the brake, at least one of said walls of at least one of said brake shoe housings being formed by said extension.

15. A disc brake as claimed in claim 14, said extension being adapted to overhang a said brake disc, and at least one of said walls of each of said brake shoe housings being formed by said extension.

16. A disc brake as claimed in claim 14, and elastic means disposed between a said brake shoe and at least one wall of the corresponding brake shoe housing, said elastic means being carried by said extension.

References Cited

UNITED STATES PATENTS

| 3,185,263 | 5/1965 | Schanz et al. | 188—73 X |
|---|---|---|---|
| 3,245,500 | 4/1966 | Hambling et al. | 188—73 |
| 3,256,959 | 6/1966 | Eggstein | 188—205 X |
| 3,294,205 | 12/1966 | Schanz | 188—205 X |
| 3,363,727 | 1/1968 | Thirion | 188—73 |

FOREIGN PATENTS

| 1,431,049 | 1/1966 | France. |
|---|---|---|
| 905,797 | 9/1962 | Great Britain. |

GEORGE E. A. HALVOSA, Primary Examiner

U.S. Cl. X.R.

188—205